(12) United States Patent
Fersdahl et al.

(10) Patent No.: US 9,057,773 B1
(45) Date of Patent: Jun. 16, 2015

(54) WEATHER INFORMATION DISPLAY SYSTEM AND METHOD

(71) Applicants: Mark C. Fersdahl, Cedar Rapids, IA (US); Venkata A. Sishtla, Marion, IA (US); Edward A. St. John, Solon, IA (US); Jeffery A. Finley, Cedar Rapids, IA (US)

(72) Inventors: Mark C. Fersdahl, Cedar Rapids, IA (US); Venkata A. Sishtla, Marion, IA (US); Edward A. St. John, Solon, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 300 days.

(21) Appl. No.: 13/707,438

(22) Filed: Dec. 6, 2012

(51) Int. Cl.
*G01S 13/95* (2006.01)
*G01S 7/20* (2006.01)
*G01S 7/04* (2006.01)

(52) U.S. Cl.
CPC *G01S 7/04* (2013.01); *G01S 13/953* (2013.01)

(58) Field of Classification Search
CPC .................................. G01S 7/04; G01S 13/953
USPC ................. 342/26 B, 176, 179–183; 340/583
See application file for complete search history.

(56) References Cited

U.S. PATENT DOCUMENTS

| | | | |
|---|---|---|---|
| 650,275 A | 5/1900 | Reeve | |
| 3,251,057 A | 5/1966 | Buehler et al. | |
| 3,359,557 A | 12/1967 | Fow et al. | |
| 3,404,396 A | 10/1968 | Buchler et al. | |
| 3,465,339 A | 9/1969 | Marner | |
| 3,491,358 A | 1/1970 | Hicks | |
| 3,508,259 A | 4/1970 | Andrews | |
| 3,540,829 A | 11/1970 | Collinson et al. | |
| 3,567,915 A | 3/1971 | Altshuler et al. | |
| 3,646,555 A | 2/1972 | Atlas | |
| 3,715,748 A | 2/1973 | Hicks | |
| 3,764,719 A | 10/1973 | Dell | |
| 3,781,530 A | 12/1973 | Britland et al. | |
| 3,781,878 A | 12/1973 | Kirkpatrick | |
| 3,803,609 A | 4/1974 | Lewis et al. | |

(Continued)

FOREIGN PATENT DOCUMENTS

| | | |
|---|---|---|
| EP | 1 329 738 B1 | 7/2003 |
| FR | 2658617 A1 | 8/1991 |

(Continued)

OTHER PUBLICATIONS

3-D Weather Hazard and Avoidance System, Honeywell InteVue Brochure dated Nov. 2008, 4 pages.

(Continued)

*Primary Examiner* — John B Sotomayor
(74) *Attorney, Agent, or Firm* — Angel N. Gerdzikov; Donna P. Suchy; Daniel M. Barbieri

(57) ABSTRACT

Systems and methods for displaying weather data relating to weather near an aircraft are provided. A method includes generating a three-dimensional weather profile of the weather near the aircraft based on reflectivity data from radar returns of a weather radar system of the aircraft. Generating the three-dimensional weather profile includes estimating weather data above a freezing layer height using a function that is based on a rate of reduction in reflectivity above the freezing layer. The method further includes transmitting weather display data to a display device, the weather display data being configured to cause the display device to display a visual representation of the three-dimensional weather profile.

22 Claims, 13 Drawing Sheets

(56) References Cited

U.S. PATENT DOCUMENTS

| | | |
|---|---|---|
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A * | 11/1998 | Stern et al. ................... 340/583 |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,456,226 B1 | 9/2002 | Zheng et al. |
| 6,480,142 B1 | 11/2002 | Rubin |
| 6,496,252 B1 | 12/2002 | Whiteley |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,372,394 B1 | 5/2008 | Woodell et al. |

(56) References Cited

U.S. PATENT DOCUMENTS

| | | |
|---|---|---|
| 7,383,131 B1 | 6/2008 | Wey et al. |
| 7,417,579 B1 | 8/2008 | Woodell |
| 7,427,943 B1 | 9/2008 | Kronfeld et al. |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,431 B1 | 12/2009 | Wey et al. |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,917,255 B1 | 3/2011 | Finley |
| 7,973,698 B1 | 7/2011 | Woodell et al. |
| 8,072,368 B1 | 12/2011 | Woodell |
| 8,089,391 B1 | 1/2012 | Woodell et al. |
| 8,111,186 B2 | 2/2012 | Bunch et al. |
| 8,159,369 B1 | 4/2012 | Koenigs et al. |
| 8,902,100 B1 * | 12/2014 | Woodell et al. .............. 342/26 B |
| 2003/0001770 A1 | 1/2003 | Cornell et al. |
| 2005/0049789 A1 | 3/2005 | Kelly et al. |
| 2006/0036366 A1 | 2/2006 | Kelly et al. |
| 2011/0148694 A1 * | 6/2011 | Bunch et al. ................ 342/26 B |
| 2012/0139778 A1 * | 6/2012 | Bunch et al. ................ 342/26 B |
| 2013/0234884 A1 * | 9/2013 | Bunch et al. ................ 342/26 B |

FOREIGN PATENT DOCUMENTS

| | | |
|---|---|---|
| WO | WO-98/07047 A1 | 2/1998 |
| WO | WO-98/22834 | 5/1998 |
| WO | WO-03/005060 | 1/2003 |
| WO | WO-2009/137158 | 11/2009 |

OTHER PUBLICATIONS

Greene et al., Vertically Integrated Liquid Water—A New Analysis Tool, Monthly Weather Review, Jul. 1972, 5 pages.

Kuntman, Satellite Imagery: Predicting Aviation Weather Hazards, ICAO Journal, Mar. 2000, 4 pages.

RDR-4B Honeywell User Manual for Forward Looking Windshear Detection/Weather Radar System, Rev. 6, Jul. 2003, 106 pages.

Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.

Stormscope Lightning Detection Systems, L3 Avionics Systems, retrieved on Jul. 11, 2011, 6 pages.

Bovith et al., Detecting Weather Radar Clutter by Information Fusion with Satellite Images and Numerical Weather Prediction Model Output; Jul. 31-Aug. 4, 2006, 4 pages.

Burnham et al., Thunderstorm Turbulence and Its Relationship to Weather Radar Echoes, J. Aircraft, Sep.-Oct. 1969, 8 pages.

Corridor Integrated Weather System (CIWS), www.ll.mit.edu/mission/aviation/faawxsystems/ciws.html, received on Aug. 19, 2009, 3 pages.

Doviak et al., Doppler Radar and Weather Observations, 1984, 298 pages.

Dupree et al.,FAA Tactical Weather Forecasting in the United States National Airspace, 29 pages.

Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.

Hodanish, Integration of Lightning Detection Systems in a Modernized National Weather Service Office, http://www.srh.noaa.gov/mlb/hoepub.html, retrieved on Aug. 6, 2007, 5 pages.

Honeywell, RDR-4B Forward Looking Windshear Detection/Weather Radar System User's Manual with Radar Operation Guidelines, Jul. 2003.

Keith, Transport Category Airplane Electronic Display Systems, Jul. 16, 1987, 34 pages.

Klingle-Wilson et al., Description of Corridor Integrated Weather System (CIWS) Weather Products, Aug. 1, 2005, 120 pages.

Kuntman et al, Turbulence Detection and Avoidance System, Flight Safety Foundation 53rd International Air Safety Seminar (IASS), Oct. 29, 2000.

Kuntman, Airborne System to Address Leading Cause of Injuries in Non-Fatal Airline Accidents, ICAO Journal, Mar. 2000.

Meteorological/KSC/L71557/Lighting Detection and Ranging (LDAR), Jan. 2002, 12 pages.

Pessi et al., On the Relationship Between Lightning and Convective Rainfall Over the Central Pacific Ocean, date unknown, 9 pages.

Waldvogel et al., The Kinetic Energy of Hailfalls. Part I: Hailstone Spectra, Journal of Applied Meteorology, Apr. 1978, 8 pages.

Wilson et al., The Complementary Use of Titan-Derived Radar and Total Lightning Thunderstorm Cells, 10 pages.

Zipser et al., The Vertical Profile of Radar Reflectivity and Convective Cells: A Strong Indicator of Storm Intensity and Lightning Probability? America Meteorological Society, 1994, 9 pages.

* cited by examiner

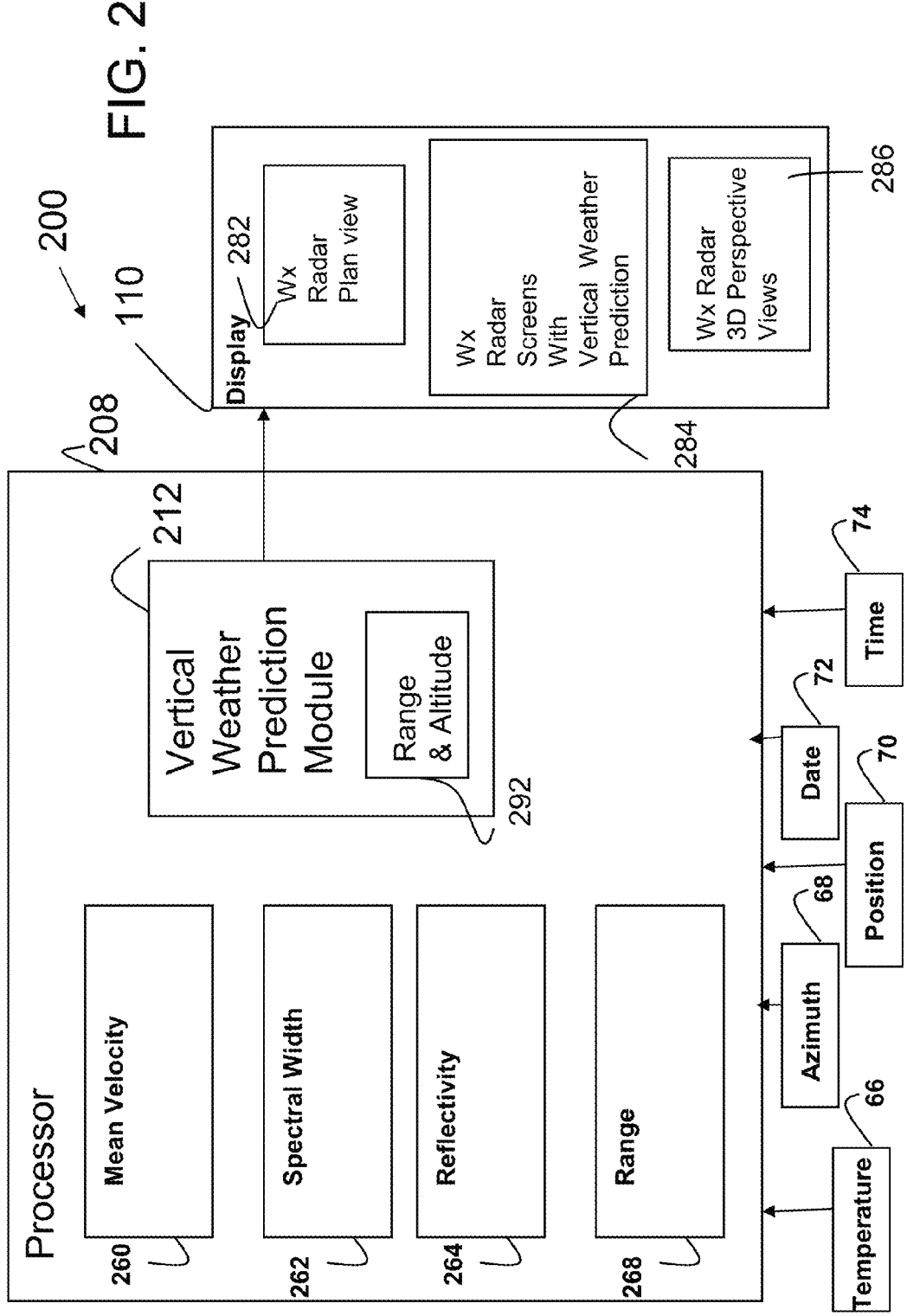

WEATHER INFORMATION DISPLAY SYSTEM AND METHOD

BACKGROUND

The present disclosure relates generally to the field of weather display systems. More particularly, the present disclosure relates to a weather display system configured to display three-dimensional perspective views of weather information generated based on radar returns from a weather radar system.

Weather display systems are often used to alert operators of vehicles, such as aircraft pilots, of weather hazards in the area near the vehicle. Conventional weather display systems are configured to display weather data in only two dimensions. A horizontal plan view provides an overview of weather patterns near an aircraft mapped onto a horizontal plane. Such a horizontal plan view does not provide the pilot with information about how displayed weather cells vary with altitude (e.g., the differences in severity at different altitudes). A vertical profile view illustrates a slice of one or more weather cells along a plane for a particular set of ranges and altitudes. Such a vertical profile view does not provide the pilot with information about the weather to either side of the displayed slice. Both of these two-dimensional views fail to provide information about the weather that the user may find important for operating the vehicle. Thus, there is a need for a weather information display that provides more information than a conventional display with a horizontal profile and a vertical profile.

SUMMARY

One embodiment of the disclosure relates to a method of displaying weather data relating to weather near an aircraft. The method comprises generating a three-dimensional weather profile of the weather near the aircraft based at least in part on reflectivity data from radar returns of a weather radar system of the aircraft. Generating the three-dimensional weather profile comprises estimating weather data above a freezing layer height using a function that is based on a rate of reduction in reflectivity above the freezing layer. The method further comprises transmitting weather display data to a display device, the weather display data being configured to cause the display device to display a visual representation of the three-dimensional weather profile.

Another embodiment relates to a system comprising an electronic processor configured to generate a three-dimensional weather profile of the weather near the aircraft based on reflectivity data from radar returns of a weather radar system of the aircraft. The electronic processor is further configured to estimate weather data of the three-dimensional weather profile above a freezing layer height using a function that is based on a rate of reduction in reflectivity above the freezing layer. The electronic processor is further configured to transmit weather display data to a display device, the weather display data being configured to cause the display device to display a visual representation of the three-dimensional weather profile.

Another embodiment relates to one or more computer-readable storage media having instructions stored thereon that are executable by one or more processors to execute a method. The method comprises generating a three-dimensional weather profile of the weather near the aircraft based on reflectivity data from radar returns of a weather radar system of the aircraft. Generating the three-dimensional weather profile comprises estimating weather data above a freezing layer height using a function that is based on a rate of reduction in reflectivity above the freezing layer. The method further comprises transmitting weather display data to a display device, the weather display data being configured to cause the display device to display a visual representation of the three-dimensional weather profile.

BRIEF DESCRIPTION OF THE DRAWINGS

The disclosure will become more fully understood from the following detailed description, taken in conjunction with the accompanying figures, wherein like reference numerals refer to like elements, in which:

FIG. 2 is a more detailed block diagram of the weather radar system of FIG. 1 according to an exemplary embodiment;

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of control devices for various types of applications or analyzed systems.

Referring generally to the figures, systems and methods for providing visual representations of weather cells in three dimensions, such as weather cells in proximity to an aircraft or other vehicle, are provided. A three-dimensional weather profile of weather near an aircraft may be constructed by transmitting radar beams from a weather radar system (e.g., using a horizontal and/or vertical scanning pattern) and measuring reflectivity data based on the radar return signals. For portions of weather cells that are positioned above the freezing layer (i.e., a layer of air above which the temperature is below the freezing temperature of water), the data used to construct the three-dimensional weather profile may be approximated based on a function that reflects a rate at which reflectivity drops off above the freezing layer according to one embodiment. A three-dimensional perspective view of the weather profile is generated and provided to a user on a display (e.g., a cockpit weather display). The three-dimensional perspective view of the weather may quickly and intuitively provide the user (e.g., the pilot) with a relatively complete view of the weather near the aircraft that the user could not easily obtain by viewing either a horizontal plan view or a vertical profile view of the weather. In some embodiments, a user input device may be provided that allows the user to rotate the three-dimensional perspective view of the weather in up to all three dimensions. In some embodiments, the user may select a plane within the three-dimensional perspective view that intersects one or more weather cells (e.g., by selecting two points or selecting a line in the three-dimensional perspective view) and a two-dimensional profile view of the weather data associated with the weather cells along the plane may be generated and displayed.

Referring generally to FIGS. 1A through 3, systems and methods that may be used to generate a three-dimensional weather profile are shown and described according to exemplary embodiments. In some embodiments, a three-dimensional weather profile may be constructed using systems and techniques described in U.S. Pat. No. 7,733,264, which is assigned to the assignee of the present application and is incorporated herein by reference in its entirety.

Figure 1A:
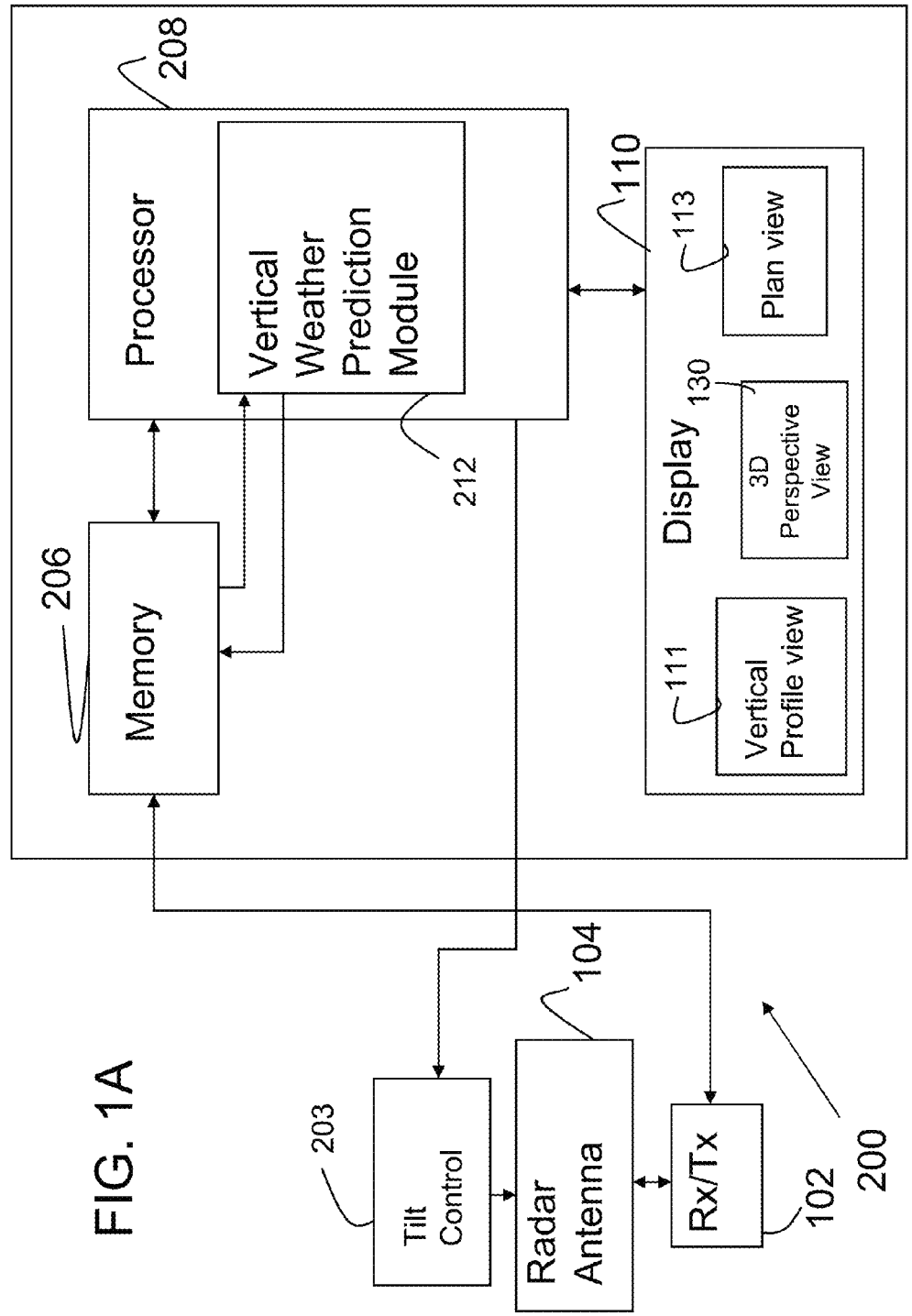
FIG. 1A is a general block diagram of a weather radar system that may be used, for example, on an aircraft according to an exemplary embodiment.

Referring specifically to FIG. 1A, a block diagram of a weather radar system 200 that may be used, for example, on a vehicle such as an aircraft is depicted according to an exemplary embodiment. In one embodiment, system 200 may be an avionics multi-scan system manufactured by Rockwell Collins, such as the RTA-4218 MultiScan weather radar system. System 200 includes a vertical weather prediction module 212 (e.g., circuit, module, or routine). Vertical weather prediction module 212 advantageously determines the presence of weather at altitudes, ranges and locations based on a calculated value that can be displayed to the pilot of an aircraft. Vertical weather prediction module 212 may be used to create a spatially correct weather interpretation that may be displayed in the range, altitude, and time domains. A combination of horizontal and selected vertical antenna beams may facilitate the collection of radar return data (IQ data) that can be used to compute parameters to construct an accurate weather model. The weather model may be altitude-based, and an estimate of the reflectivity based on radar returns may be obtained for any scan angle, range, and altitude combination. Vertical weather prediction module 212 may store the altitude-based weather model in a memory 206, and the weather model may be used to extract weather information in a defined manner (e.g., based on user actions).

Avionics weather radar system 200 includes a weather radar receiver/transmitter 102, a weather radar adjustable antenna 104, a processor 208, and a memory 206 (e.g., a multi-scan, multi-tilt angle memory). System 200 also includes a tilt control 203 for automatically controlling the tilt angle (mechanical or electronic) of the antenna 104; this auto control may include an additional manual control feature as well.

Memory 206 may be capable of storing in a readily addressable and rapidly retrievable manner at least two data sets resulting from two or more antenna sweeps at different angles. Memory 206 can include any type of machine-readable storage device capable of storing radar returns or associated data for analysis/processing by processor 208. In some embodiments, memory 206 can store parameters of a weather model. The data in memory 206 can represent factors for a mathematical relationship defining reflectivity as a function of altitude in one embodiment. The data in memory 206 can be used by vertical weather prediction module 212 to determine weather that should be displayed on display 110. Although a multi-scan, multi-tilt scanning and data sets are described, it should be understood by one of ordinary skill in the art that a single scan of data may also be used in some embodiments. Memory 206 can also be a three dimensional storage buffer for storing weather radar parameters according to X, Y and Z coordinates according to one embodiment. The storage of radar data and the form of the weather data stored therein is not disclosed in a limiting fashion. A variety of storage techniques for weather data can be used without departing from the scope of the invention.

Weather data can be stored in memory 206. The weather data can be based on received horizontal and/or vertical scans. In some embodiments, the data may be stored as a mathematical equation representation of the information. The mathematical equation representation may be a piecewise linear function, piecewise nonlinear function, coefficients of a cubic spline, coefficients of a polynomial function, etc. that represent vertical representations of the weather based on the horizontal scan data and/or horizontal representation of the weather based on the vertical scan data. The function may be an equation based on weather parameters that may be sensor driven, model driven, a merger of sensor and model, etc. Although horizontal scan data is described, alternative embodiments may include X, Y Cartesian coordinates, rho/theta input, latitude and longitude coordinates, altitude, etc. Weather may be estimated for any required point in space with the vertical dimension being the subject of the weather equation.

Display 110 can be part of an avionic multi-function display (MFD) unit in one embodiment. In some embodiments, display 110 may be any of a variety of display types, such as a navigation display, an electronic flight bag, a tablet computing device, a synthetic vision system, a heads up display (HUD), a dedicated weather display, or another type of display system. In some embodiments, display 110 may be a remote display not included within a cockpit of the aircraft, such as a ground-based support display or remote display configured to display information regarding whether near an unmanned aerial vehicle (UAV). Processor 208 may be included as part of a multi-scan, multi-tilt angle weather radar system and may perform the customary functions performed by a conventional weather radar return processing unit. Processor 208 may also perform several additional operations based upon the additional data and/or instructions provided in memory 206. In general, processor 208 can merge or cross qualify portions, or ranges, of the radar returns of several different antenna sweeps at several different tilt angles, so that a single, relatively clutter-free image may be presented to the pilot based upon the several separate scans. The radar returns may be processed by processor 208 to generate a three-dimensional weather profile of the weather near the aircraft.

System 200 may perform a scanning operation by transmitting at least two beams at different tilt angles. In some embodiments, system 200 may use a global positioning system (GPS), terrain database, or other tool to control the tilt control 203. Data obtained from the radar returns (e.g., reflectivity data) may be stored in memory 206. For example, known ground clutter may be removed from each of the returns using ground clutter suppression techniques.

Convective weather has a vertical reflectivity gradient which extends from the ground to a point where the radar can no longer detect echoes from the weather. This gradient may have similar characteristics from weather cell to weather cell. A typical weather cell will have substantial, nearly constant reflectivity between the ground and the height at which the atmospheric moisture begins to freeze.

Figure 1B:
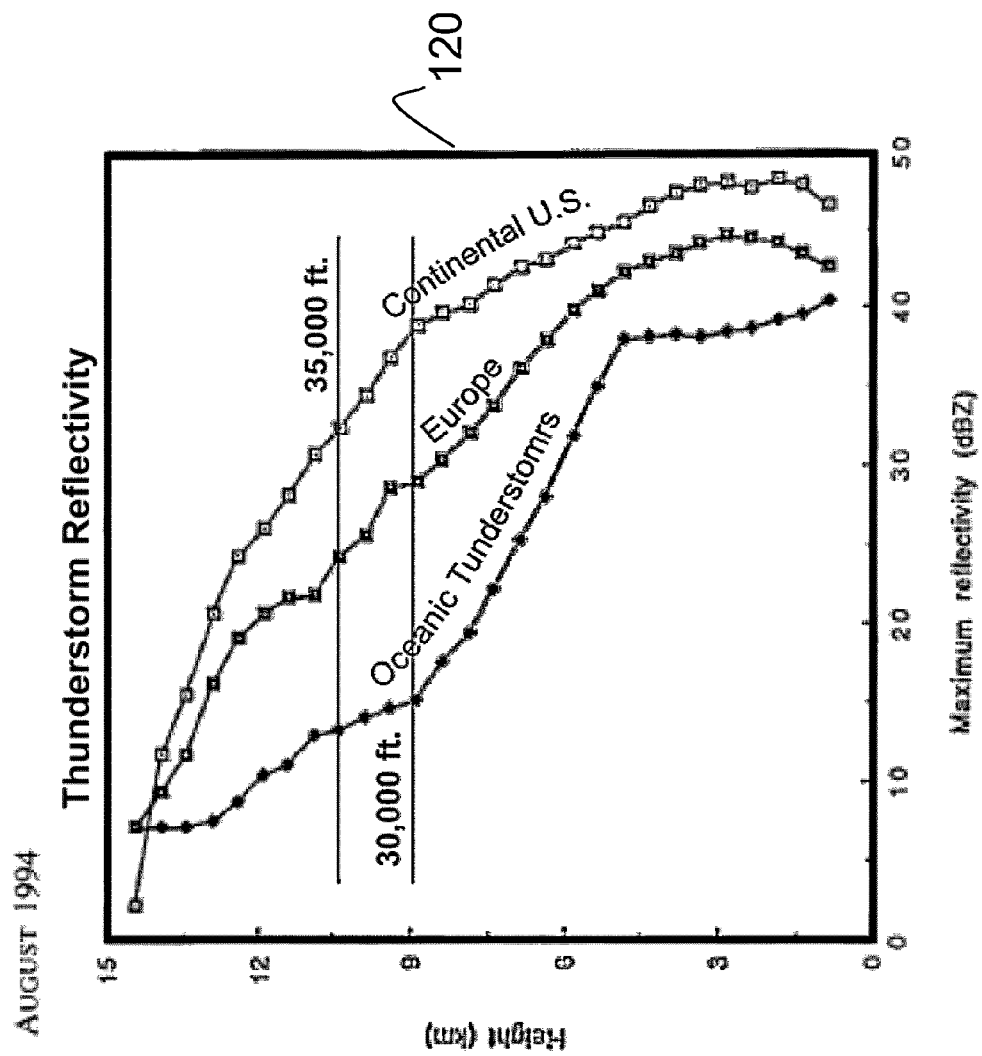
FIG. 1B is a graph showing typical convective cell reflectivity gradients as a function of geographical location according to an exemplary embodiment.

Above the freezing layer, the reflectivity falls off in a nearly linear manner until the storm generally tops out at the top of the troposphere. Referring now to FIG. 1B, a graph 120 showing typical convective cell vertical reflectivity gradients as a function of geographical location is shown. The graph 120 represents convective cell vertical gradients as shown in Zipser, E. J. and Lutz, K. R., "The Vertical Profile of Radar Reflectivity of Convective Cells," American Meteorological Society, Volume 122, Issue 8, August 1994. Functions representative of these types of gradients may be generated and stored in memory 206 for various range and azimuth locations along a flight path. For example, such functions may be based on the slopes of the gradients at the different locations along the flight path. The gradients (e.g., slopes of the gradients) may vary according to factors such as geographic location, time of day, and/or time of year. In some embodiments, coefficients of the functions can be adjusted based on the received weather radar information. For example, some highly energetic weather cells may produce overshooting tops that intrude into the troposphere. The energy state of a cell may be estimated from the vertical gradient and dBz level aloft.

Referring again to FIG. 1A, in some embodiments, processor 208 may be configured to store parametric characteristics of the vertical extent of the weather in memory 206 instead of detecting and storing the entire reflectivity profile in a traditional three-dimensional memory. For example, since the radar knows current altitude and outside air temperature, processor 208 can be configured to estimate the altitude of the local atmospheric freezing layer. Further, processor 208 can estimate the height of the troposphere based on latitude, season, or more precise FMS data. Using this information and radar elevation scan data collected from scanning processes (e.g., normal MultiScan two-tilt or three-tilt processes), processor 208 may generate a linear fit of the reflectivity data from the ground to the freezing layer and another linear fit between the freezing layer and top of the troposphere. Details associated with the vertical profile in this embodiment can include the ground height, freezing layer height, the troposphere height, the reflectivity level at ground level, the reflectivity level at freezing layer, and the reflectivity level at the troposphere top. This information is sufficient to generate a function which can generate vertical reflectivity at any altitude. In some embodiments, the reflectivity data may be generated at or near a time of rendering an image of the weather on display 110 by extrapolating the vertical weather data in real-time or near real-time. In some embodiments, the reflectivity data may be generated some amount of time in advance of rendering on display 110 and stored in memory 106 (e.g., a three-dimensional memory).

Some embodiments may use more complex curve fits. Specific curve fits can be utilized depending on geographical location, time of day, time of year, etc. For example, over Europe, a linear curve fit may suffice to determine vertical reflectivity between freezing layer and troposphere height whereas a second order fit may be required over the equatorial Pacific. A tag can be given to each cell denoting the specific order of the data fit and, correspondingly, the method used to obtain vertical data from the stored parameters. As additional data is collected, perhaps through dedicated vertical scans of convective cells, the functions can be updated or increased in complexity in order to improve their accuracy.

This process allows a rapid assessment of vertical cell extent with a minimum of data. Rapid assessment may significantly increase the speed of such an assessment in turns or during initial radar power up.

Processor 208 may process weather radar returns to identify or sense the presence of weather in front of or in view of the aircraft. Vertical weather prediction module 212 may utilize the altitude and the range to the weather to generate a vertical profile associated with the weather. Vertical weather prediction module 212 may scan across an array of azimuths to generate a three-dimensional weather profile of the weather near the aircraft, which may be stored for later presentation or immediately presented on display 110.

After vertical weather prediction module 212 generates a three-dimensional weather profile for the weather, processor 208 may transmit data to display 110 that causes display 110 to present a visual representation of the three-dimensional weather profile on a 3D perspective view screen 130. 3D perspective view screen 130 may provide a full representative view of the weather near the aircraft (e.g., in front of the aircraft) in a manner that illustrates information about the weather in three dimensions (e.g., two horizontal dimensions and one vertical dimension). In some embodiments, display 110 may be a two-dimensional display device and 3D perspective view screen 130 may provide an image of the weather that is configured to simulate information about the weather in three dimensions. In some embodiments, display 110 may be a three-dimensional display device. 3D perspective view screen 130 may provide in a single display screen information about how the weather near the aircraft varies across a range of lateral or horizontal coordinates (e.g., across ranges/bearings from the aircraft, across latitude/longitude coordinates, etc.), such as may be obtained from a horizontal plan screen 113, and information about how the weather varies at different altitudes, such as may be obtained from a vertical profile screen 111. This may allow a pilot to make critical decisions about how to navigate the aircraft to avoid weather hazards, such as whether the pilot should navigate the aircraft on a different bearing or move the aircraft to a different altitude, quickly and easily using a single display screen without having to repeatedly switch between a horizontal plan view and vertical profile view to obtain the relevant information. In some embodiments, display 110 may be configured to also allow the user to view a vertical profile screen 111 and/or horizontal plan screen 113 (e.g., separately or simultaneously).

In some embodiments, system 200 may be configured to receive user input from a user input device and modify the displayed representation of the three-dimensional weather profile based on the user input. For example, display 110 may be a touch-sensitive display device with a touch-sensitive display surface through which a user may provide input. In other embodiments, system 200 may additionally or alternatively include other types of input devices, such as a mouse, bezel keys, or other types of separate input devices. Processor 208 may be configured to cause display 110 to rotate the weather image presented on 3D perspective view screen 130 based on the user input in up to three dimensions. For example, if display 110 is a touch-sensitive display device, the user may press and drag a portion of 3D perspective view screen 130 and the image may rotate in a corresponding manner (e.g., if the user drags the image horizontally, the image may rotate in the corresponding direction about a vertical axis, and if the user drags the image diagonally, the image may rotate in the corresponding diagonal direction about multiple axes). The user input device may enable a user to view the weather representation from any height, angle, and/or spatial position, including, but not limited to, a first person view from the perspective of the aircraft along its current flight path. In some embodiments, user input may be used to perform additional or alternative functions, such as zooming in or out of a particular portion of the display weather or displaying textual and/or numerical information about a particular weather cell or portion thereof.

In some embodiments, user input may be used to allow a user to select a two-dimensional cross-section of the weather shown in 3D perspective view screen 130 to be viewed on display 110. For example, if display 110 is a touch-sensitive display device, a user may select a plane that the user wishes to be used in generating the two-dimensional view by, for example, selecting two points on the plane or drawing a line in the desired plane. Processor 208 may be configured to generate a two-dimensional view (e.g., a vertical side profile view) of the weather cell data for the selected plane. In some embodiments, the user may select the plane by selecting an azimuth from the aircraft. In some embodiments, the user may select any plane in 3D perspective view screen 130, including a plane that does not intersect the current position of the aircraft. For example, if the aircraft is approaching a line of cells that are perpendicular to the current flight path of the aircraft (e.g., a squall line), the pilot may select a line that intersects the weather (e.g., a line approximately perpendicular to the flight line of the aircraft). A vertical profile view may then be generated based on the vertical plane associated with the selected line. The generated vertical profile view may allow the pilot to assess which cells have the greatest or least vertical extent.

In some embodiments, additional visual indicators other than the representation of weather may be provided within 3D perspective view screen 130. In some embodiments, a range and bearing matrix having range markers indicating distance from a current position of the aircraft and bearing markers indicating azimuths from a current flight path or bearing of the aircraft may be provided and may assist the pilot in cognitive recognition of weather features from the pilot's perspective. In some embodiments, visual indicators may be provided to represent whether a cell is growing or decaying in size and/or severity (e.g., an up arrow for a growing cell and a down arrow for a decaying cell). In some embodiments, threat indicators may be provided to warn the user of threats associated with weather cells being approached by the aircraft, such as a predicted overflight condition.

Vertical weather prediction module 212 can be implemented using hardware, software, or a combination thereof. In one embodiment, module 212 is a software routine that operates within processor 208. Although shown as part of processor 208, module 212 can be a separate circuit or be provided between display 110 and processor 208. According to one embodiment, module 212 can be implemented upon its own processor platform. In some embodiments, vertical weather prediction module 212 determines the range and altitude associated with the sensed weather. The range and altitude may be used so that vertical weather prediction module 212 can generate a vertical profile for sensed weather. One or more vertical profiles may be used to generate a three-dimensional weather profile of weather in proximity to the aircraft for display on display 110.

With reference to FIG. 2, processor 208 of system 200 can receive additional parameters associated with the weather radar return data. The additional parameters can be utilized to improve the quality of the vertical weather prediction.

Processor 208 can provide a mean velocity parameter 260 and a spectral width parameter 262 derived from weather radar returns. Alternatively, other types of velocity parameters can be utilized. In addition, processor 208 can provide a reflectivity parameter 264 and a range parameter 268 to circuit 212. Computed range or range parameter 268 along with scan angle position can be used to plot the position of weather on display 110. Processor 208 can also provide a temperature parameter 66, an azimuth 68, a position 70, a date 72, and time 74. Alternatively, a separate temperature sensor 66 can be coupled to processor 208. Parameters 260, 262, 264, and 268 can be computed by processor 208 using data stored in memory 206.

Processor 208 can use parameters 260, 262, 264, and 268 to determine hazards. Parameters 260, 262, 264, and 268 can also be used to improve the quality of the vertical weather prediction. For example, if processor 208 determines that the weather includes a convective cell that is growing, that characteristic can be considered when determining the height and/or other characteristic of the weather as discussed above.

Display 110 is configured to provide a 3D perspective view of weather radar screen 286 that provides a visual representation of the three-dimensional weather profile constructed by vertical weather prediction module 212. In some embodiments, display 110 may additionally provide a plan view mode weather radar screen 282 and/or a vertical weather prediction mode screen 284. In one embodiment, the pilot can toggle between screens 282, 284, and 286 based upon a manual input. Alternatively, screens 282, 284, and/or 286 can automatically be provided on display 110 when the aircraft is in a particular flight mode, such as a rapid turn.

In some embodiments, processor 208 and/or module 212 may be implemented in software subroutines. The routines can be executed on one or more processors associated with system 200. In one embodiment, system 200 uses a hardware platform of a weather radar system manufactured by Rockwell Collins. However, the embodiments of the present disclosure are not limited to implementation on any particular type of hardware platform.

Figure 3:
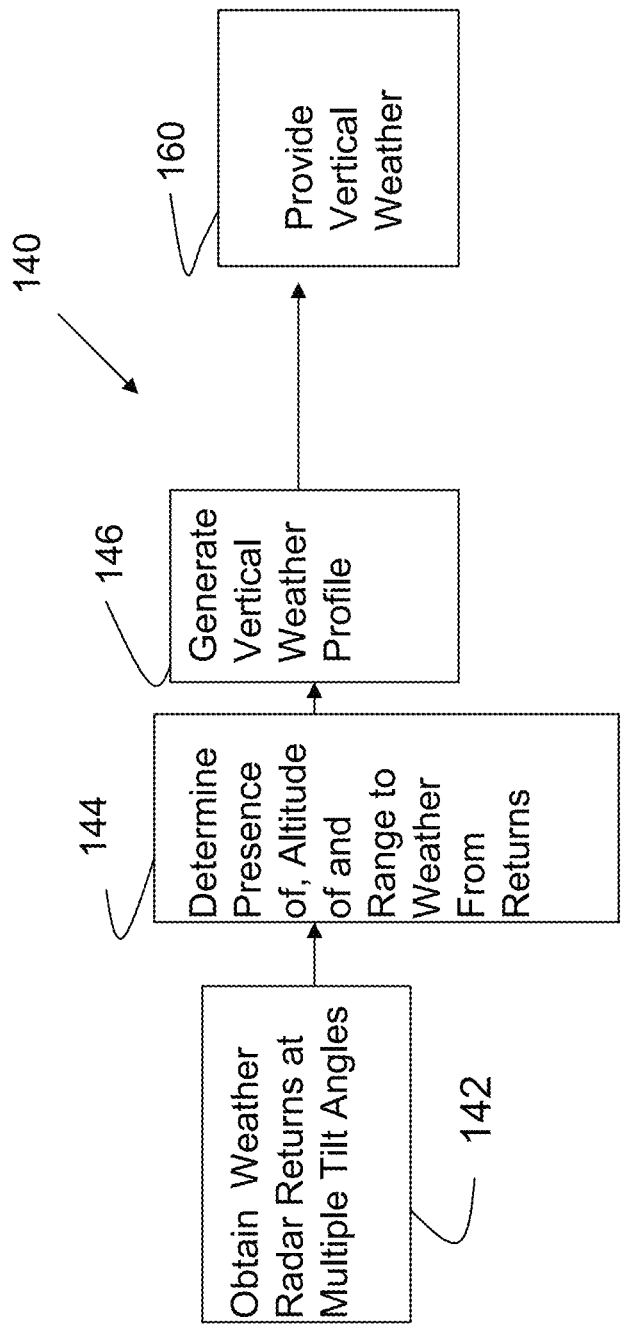
FIG. 3 is a flow diagram of a process for generating a vertical weather profile of sensed weather data according to an exemplary embodiment.

With reference to FIG. 3, a flowchart illustrates a process 140 in which processor 208 of system 200 provides signals, either directly to receiver/transmitter circuit 102 or indirectly through memory 206, to provide radar beams at radar antenna 104. In some embodiments, process 140 may be implemented using instructions stored on a machine-readable medium (e.g., memory 206) and executed on a processor (e.g., processor 208). Processor 208 may be configured to operate system 200 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206 (142). Receiver/transmitter circuit 102 can be a single path or can have separate circuits for a receive path and a transmit path. Processor 208 may determine power associated with the radar returns.

Processor 208 processes the weather radar returns to determine the presence of weather and the altitude and range of weather (e.g., based on reflectivity) (144). In one embodiment, the altitude of weather can be determined by comparing power levels of radar returns at different tilt angles.

Vertical weather prediction module 212 can generate a vertical weather profile at a given range and over a defined altitude (146). Vertical weather prediction module 212 can generate a vertical profile for a given range and azimuth at an altitude or an altitude range for the weather. The process may be repeated over an array of azimuth angles to generate a three-dimensional profile of the weather near (e.g., in front of) the aircraft.

Generating a vertical weather profile can include updating coefficients to a function whose inputs are a horizontal location to the weather and whose output is the reflectivity at any given altitude. The functions may be associated with a grid of horizontal location or may be associated with an individual weather feature such as a weather cell. Low altitude reflectivity can be used as a starting point for the estimation of radar reflectivity at an altitude. Low altitude reflectivity can be modified using the function or any other mathematical construct. The functions inputs may include many factors such as geography, atmospheric state, sensed weather feature horizontal or vertical size, sensed weather feature area, results from other sensor systems, time, date, etc.

Image data is provided for eventual conversion to a display signal for display 110 (160). The image data is for providing visual indicia of significant weather.

Figure 4:
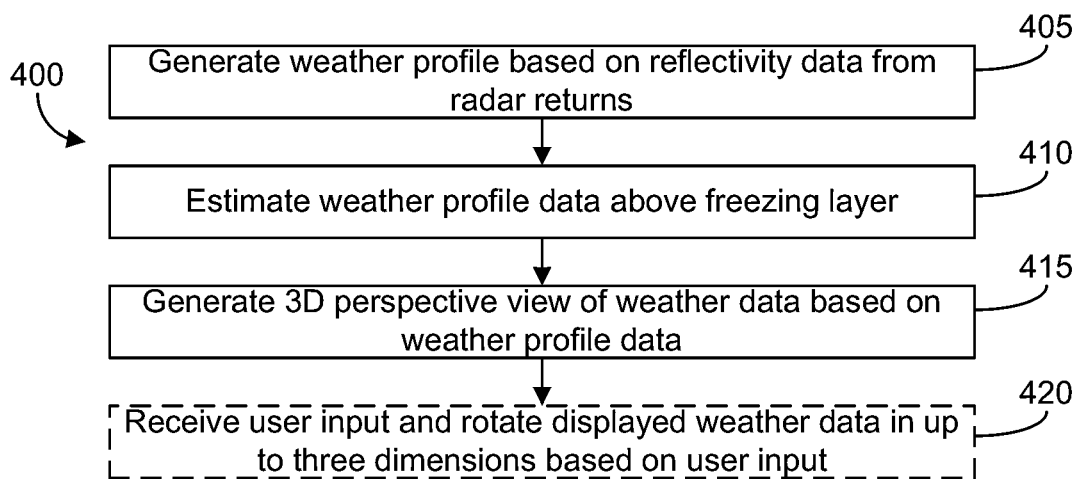
FIG. 4 is a flow diagram of a process for generating a three-dimensional perspective view of weather data based on a weather profile according to an exemplary embodiment.

Referring now to FIG. 4, a flow diagram of a process 400 for providing a three-dimensional or perspective view of weather data is shown according to an exemplary embodiment. In some embodiments, process 400 may be implemented using instructions stored on a machine-readable medium (e.g., memory 206) and executed on a processor (e.g., processor 208).

A weather radar system may be configured to generate a three-dimensional or perspective weather profile based on reflectivity data obtained from radar returns (405). For portions of the weather positioned above a freezing layer, the weather data for the three-dimensional weather profile may be estimated using a function that is based on a slope of a gradient associated with the airspace above the freezing layer (410). The slope may be based on a drop off in the maximum reflectivity of radar returns above the freezing layer. The gradient and the slope of the gradient may vary based on geographic location, time of day, time of year, weather cell characteristics, and/or other factors. The weather radar system may be configured to adjust the estimates for weather cell portions above the freezing level based on such factors. Once the three-dimensional weather profile has been constructed, the weather radar system may be configured to transmit display data to a display device causing the display device to display a visual representation of the three-dimensional weather profile (415). In some embodiments, user input may be received and may be used to rotate the displayed image in up to three dimensions, allowing the user to view a complete representation of the weather near the aircraft in both horizontal and vertical domains. The user input may include an indication that the user wishes to rotate the image and a desired direction of rotation. In various embodiments, the user input may include a hold and drag operation (e.g., a click or tap and drag), input including a magnitude and direction (e.g., a numerical input, such as an absolute magnitude or percentage), etc. For example, if the user taps and drags a point on the image to the right, the display may be configured to rotate the image about a vertical axis in the rightward direction. In another example, if the user taps and drags the point upward, the display may be configured to rotate the image about a horizontal axis in the upward direction. In still further examples, if the user taps and drags the point in a direction other than directly horizontal or vertical, such as diagonally, the image may be rotated along an axis that traverses multiple dimensions of the display coordinates.

Figure 5:
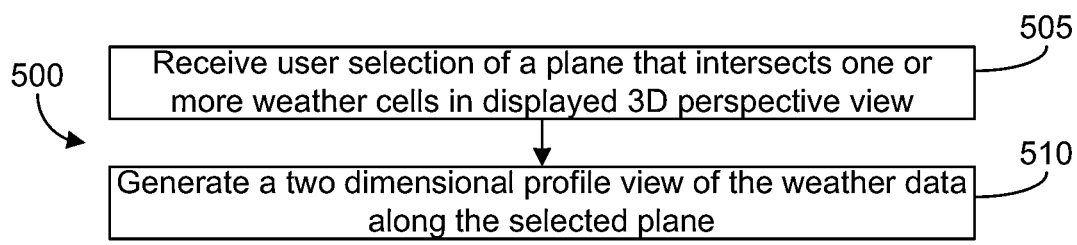
FIG. 5 is a flow diagram of a process for generating a two-dimensional profile view of weather data based on user input selecting a plane in a three-dimensional perspective weather view according to an exemplary embodiment.

Referring now to FIG. 5, a flow diagram of a process 500 for generating a two-dimensional profile view based on user input received with respect to a three-dimensional perspective view of weather is shown according to an exemplary embodiment. In some embodiments, process 500 may be implemented using instructions stored on a machine-readable medium (e.g., memory 206) and executed on a processor (e.g., processor 208).

When the three-dimensional perspective view of the weather near the aircraft is being displayed, a user may provide input via a user input device (e.g., touch-sensitive display) that represents a selection of a plane that the user wishes to use as the basis for a two-dimensional profile view (505). The plane selection may be provided by the user using any method, such as by selecting two points or drawing a line in the three-dimensional profile view. The weather radar system may be configured to determine the plane (e.g., vertical plane) associated with the user input selection and generate a two-dimensional profile view (e.g., vertical profile view) of the weather data along the selected plane (e.g., a two-dimensional cross section of the weather cells along the selected plane in the range and altitude domains) (510). The generated profile view may be presented to the user on the display device.

Figure 6:
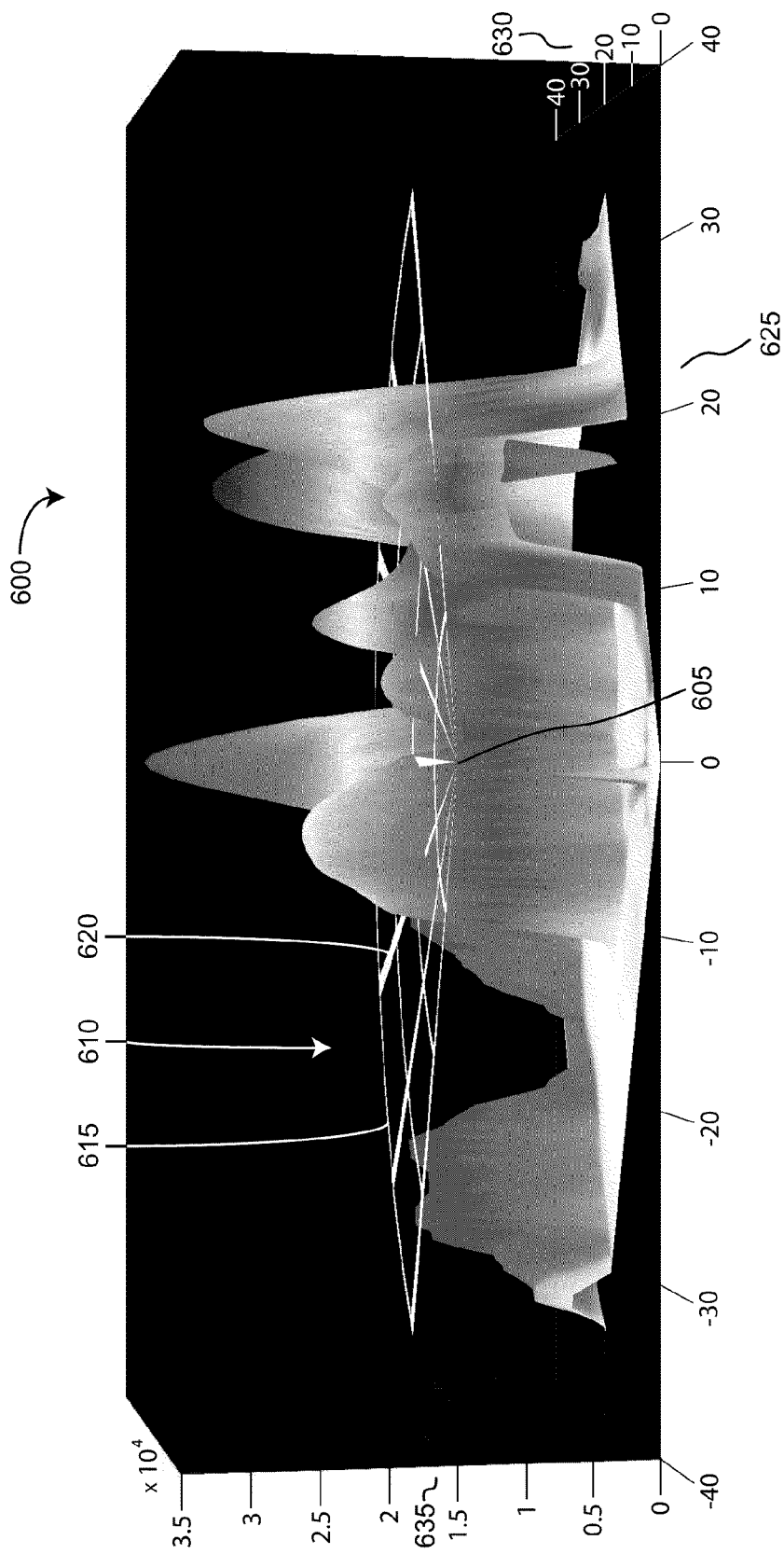
FIGS. 6-13 illustrate display images providing three-dimensional profile views of weather near an aircraft according to exemplary embodiments.

Referring now generally to FIGS. 6-13, various display images are shown representing three-dimensional perspective views that may be generated for a particular weather pattern in front of an aircraft according to exemplary embodiments. Referring specifically to FIG. 6, a display image 600 is shown having a current position of the aircraft approximately centered in image 600. Image 600 includes a first horizontal axis 625 that is perpendicular to a current flight path or bearing of the aircraft and is centered about the current position of the aircraft. Image 600 includes a second horizontal axis 630 that is also centered about a current position of the aircraft and illustrates distance marks in front of the aircraft in the direction of travel of the aircraft. Image 600 includes a vertical axis 635 that provides information regarding the altitude of the aircraft and the various portions of the weather cells in front of the aircraft.

Image 600 also includes a range and bearing matrix 610 extending from a current position 605 of the aircraft through the weather cells along a current flight plane or altitude plane of the aircraft. Range markers 615 provide an indication of the range or distance from the current aircraft position to various portions of the displayed weather. Bearing markers 620 provide an indication of azimuths from a current bearing or flight path of the aircraft to the different portions of the displayed weather. Range and bearing matrix 610 may assist the pilot in making decision as to whether a flight path of the aircraft should be modified to avoid weather hazards near the aircraft.

Various portions of the weather patterns illustrated in FIGS. 6-13 may be provided in different colors, shades, patterns, etc. to indicate different levels of weather severity. For example, an upper or higher-severity portion of the weather may be illustrated in red, a medium-severity portion may be illustrated in yellow, and a lower-severity portion may be illustrated in green. A gradient of colors and/or shading may be used to show a continuous or semi-continuous range of severities. In some embodiments, the color or shading levels may relate to a storm top (e.g., a 20 dBZ storm top) as measured by the radar. In some embodiments, the colormap may relate to a peak dBZ within a vertical column or the reflectivity at any chosen altitude.

Figure 7:
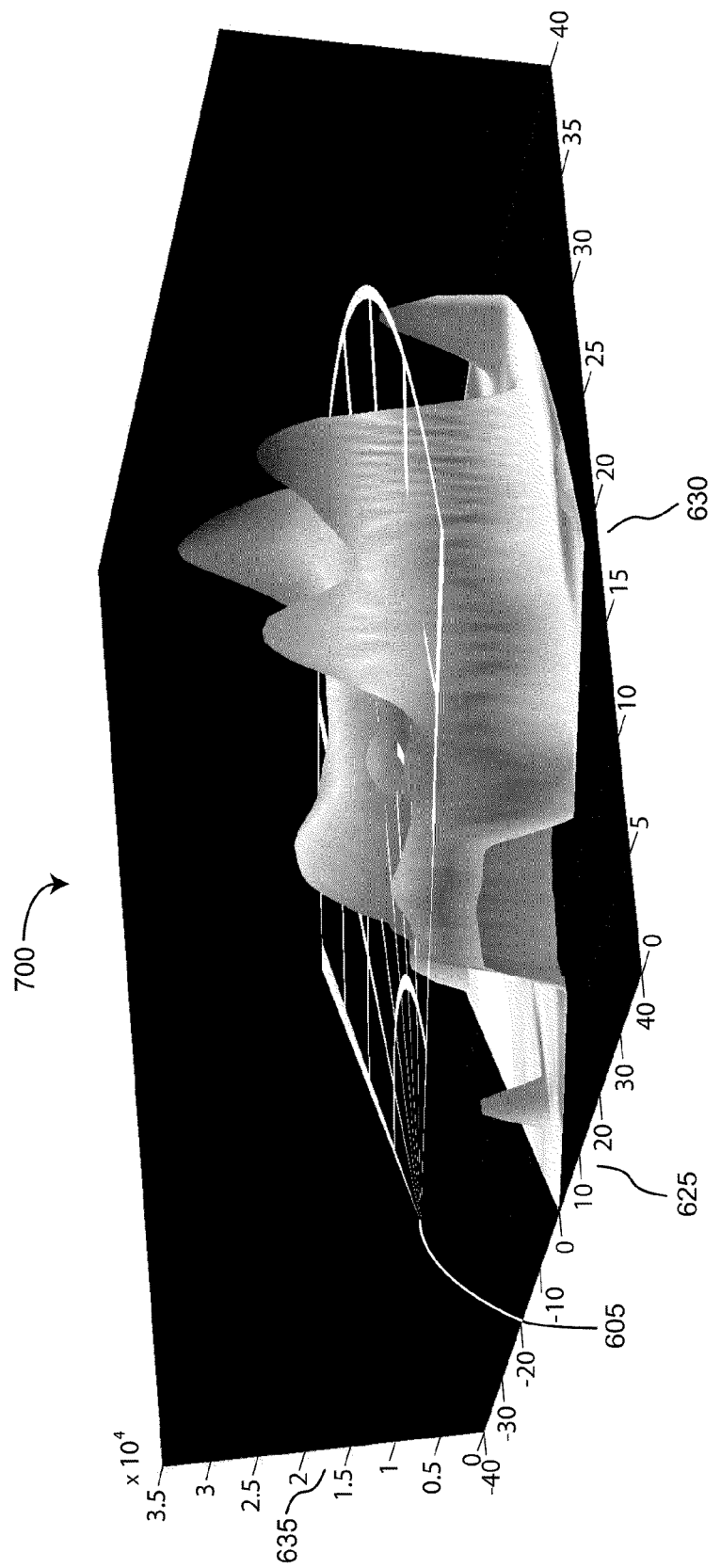
Figure 8:
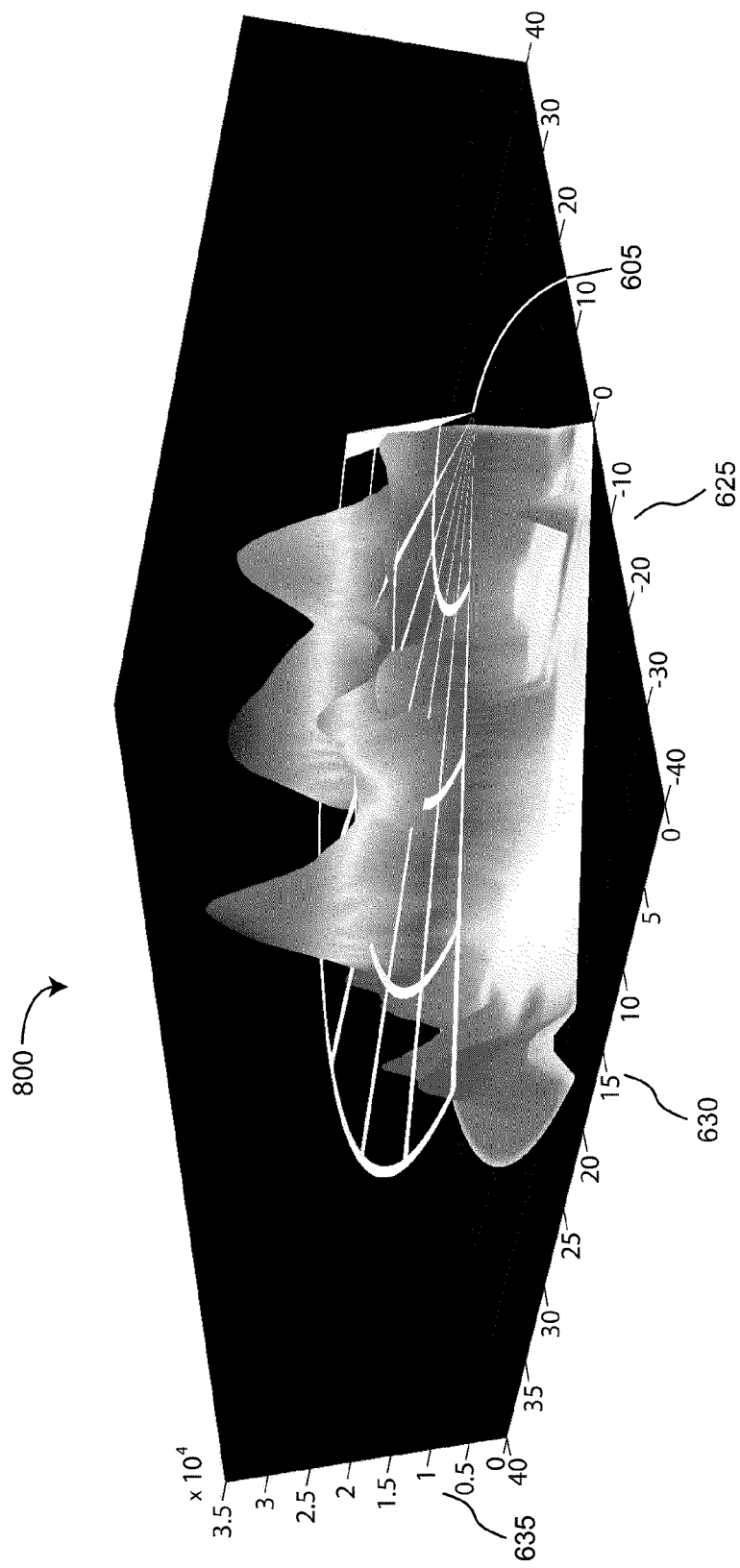
Figure 9:
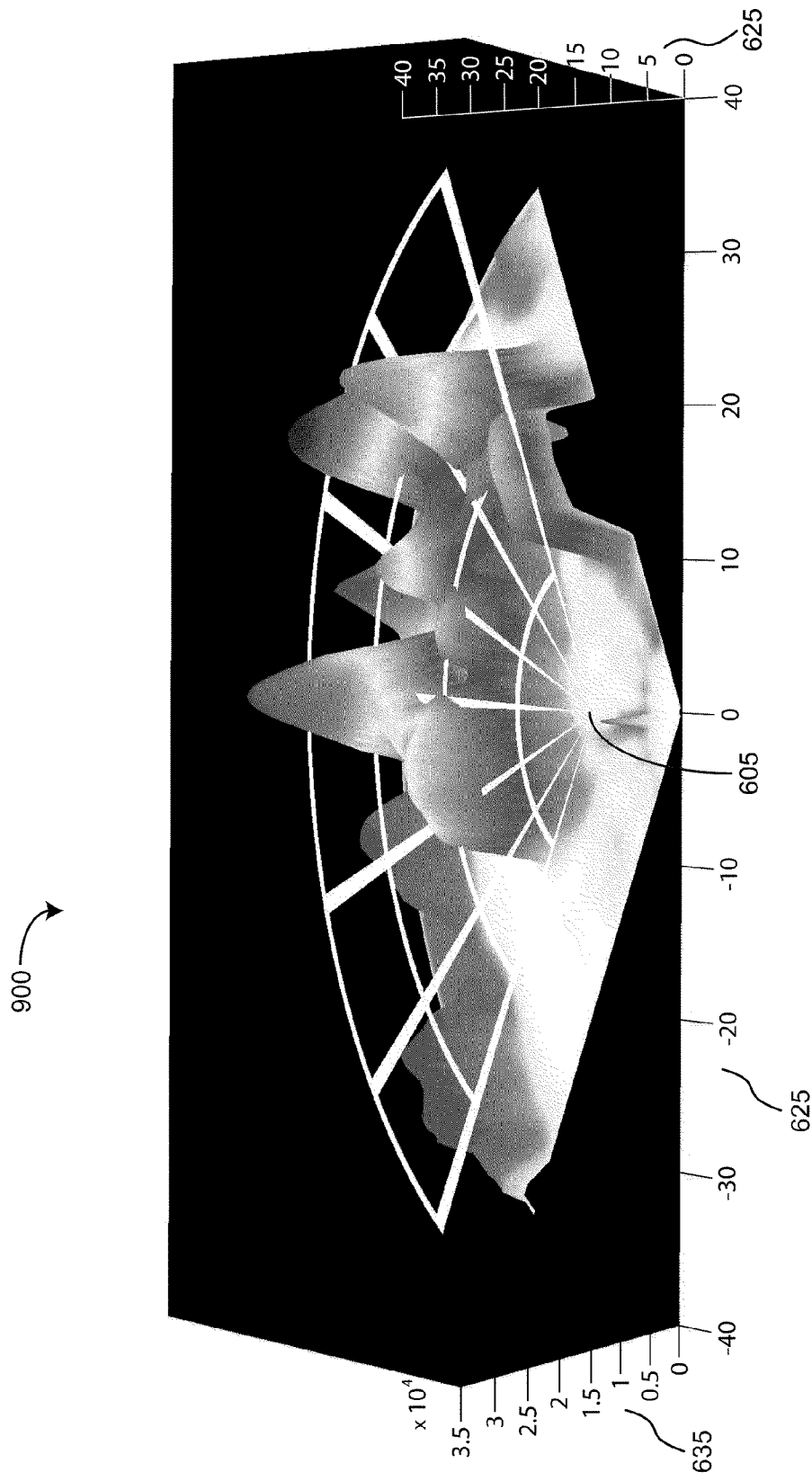
Figure 10:
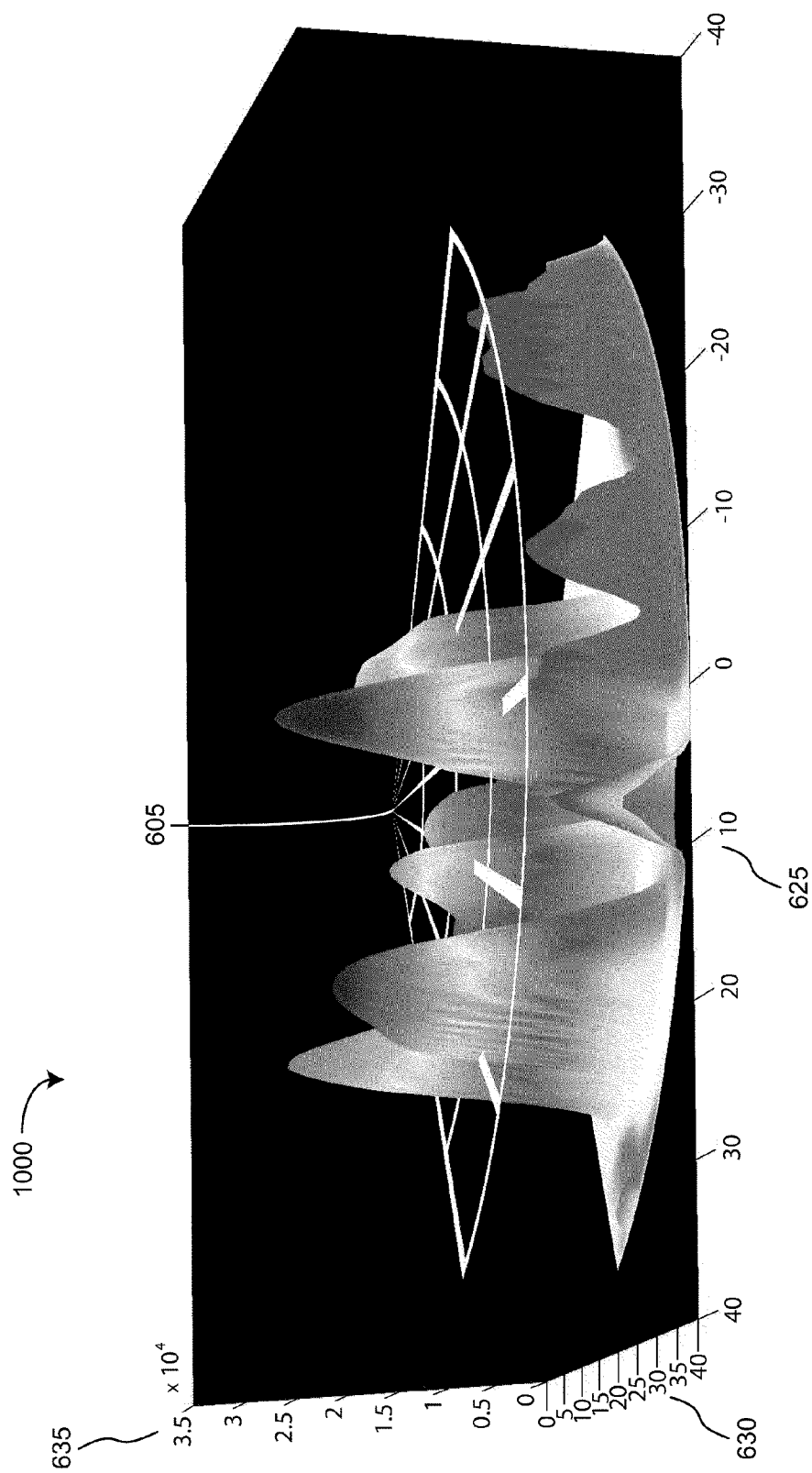
Figure 11:
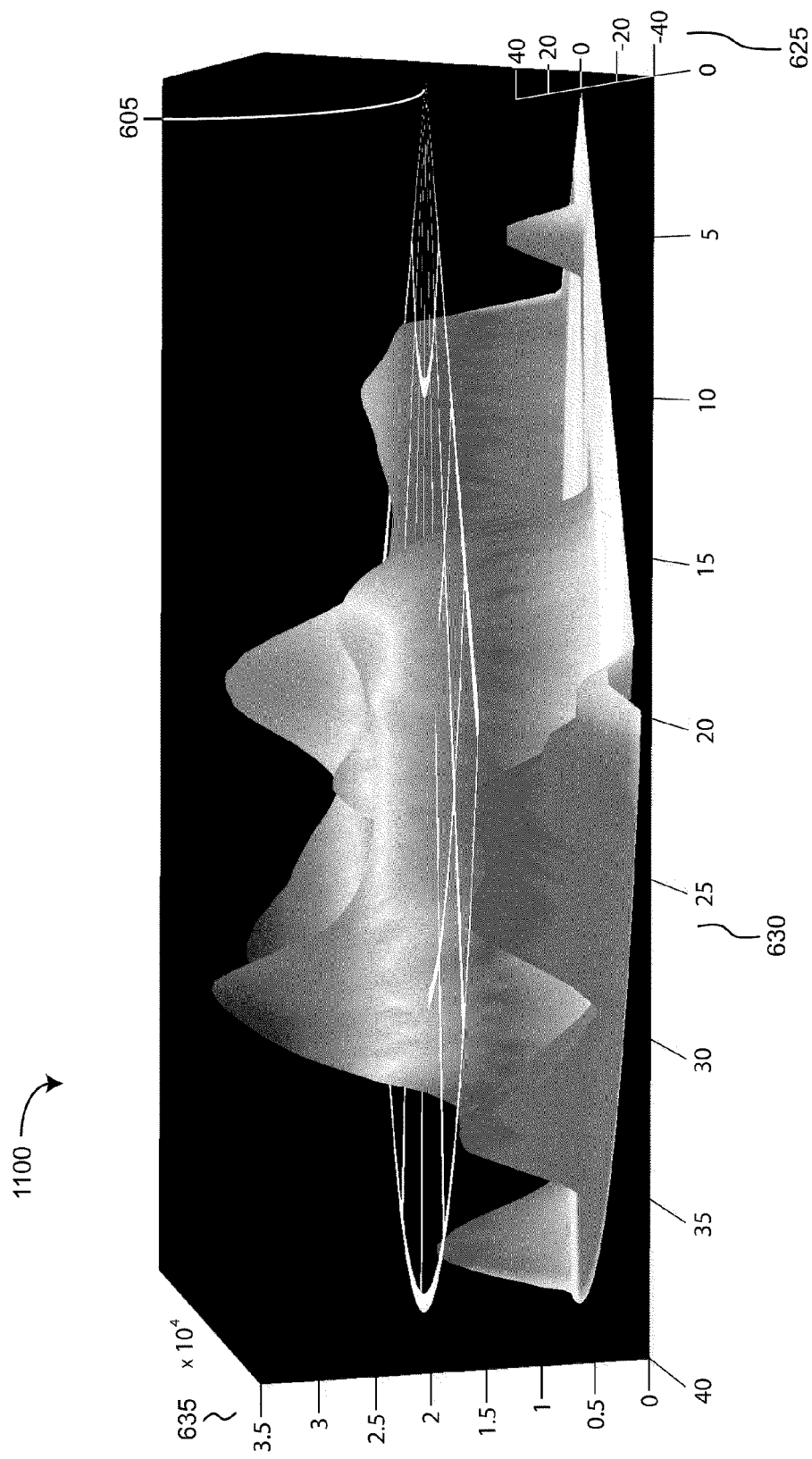
Figure 12:
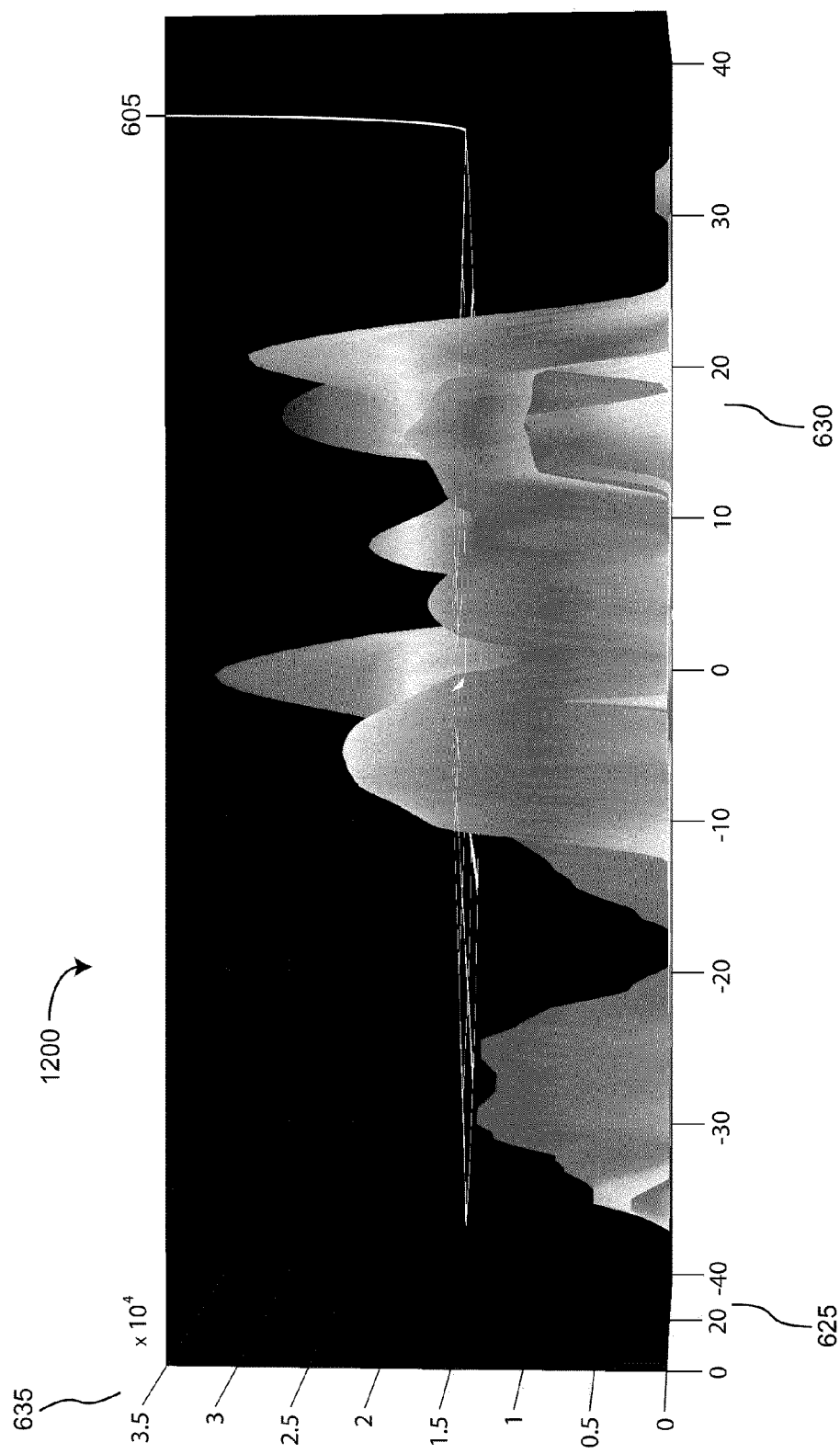

FIGS. 7-12 illustrate various display images that may be provided in response to user input to rotate image 600. FIGS. 7 and 8 illustrate images 700 and 800, respectively, that may be provided when image 600 is rotated to the side. FIG. 9 illustrates an image 900 that may be shown when image 600 is tilted downward to provide a more overhead-oriented view of the weather features. FIG. 10 illustrates an image 1000 showing the features of the weather shown from a side opposite the current position of the aircraft. FIGS. 11 and 12 illustrate images 1100 and 1200, respectively, providing side views of the weather pattern.

Figure 13:
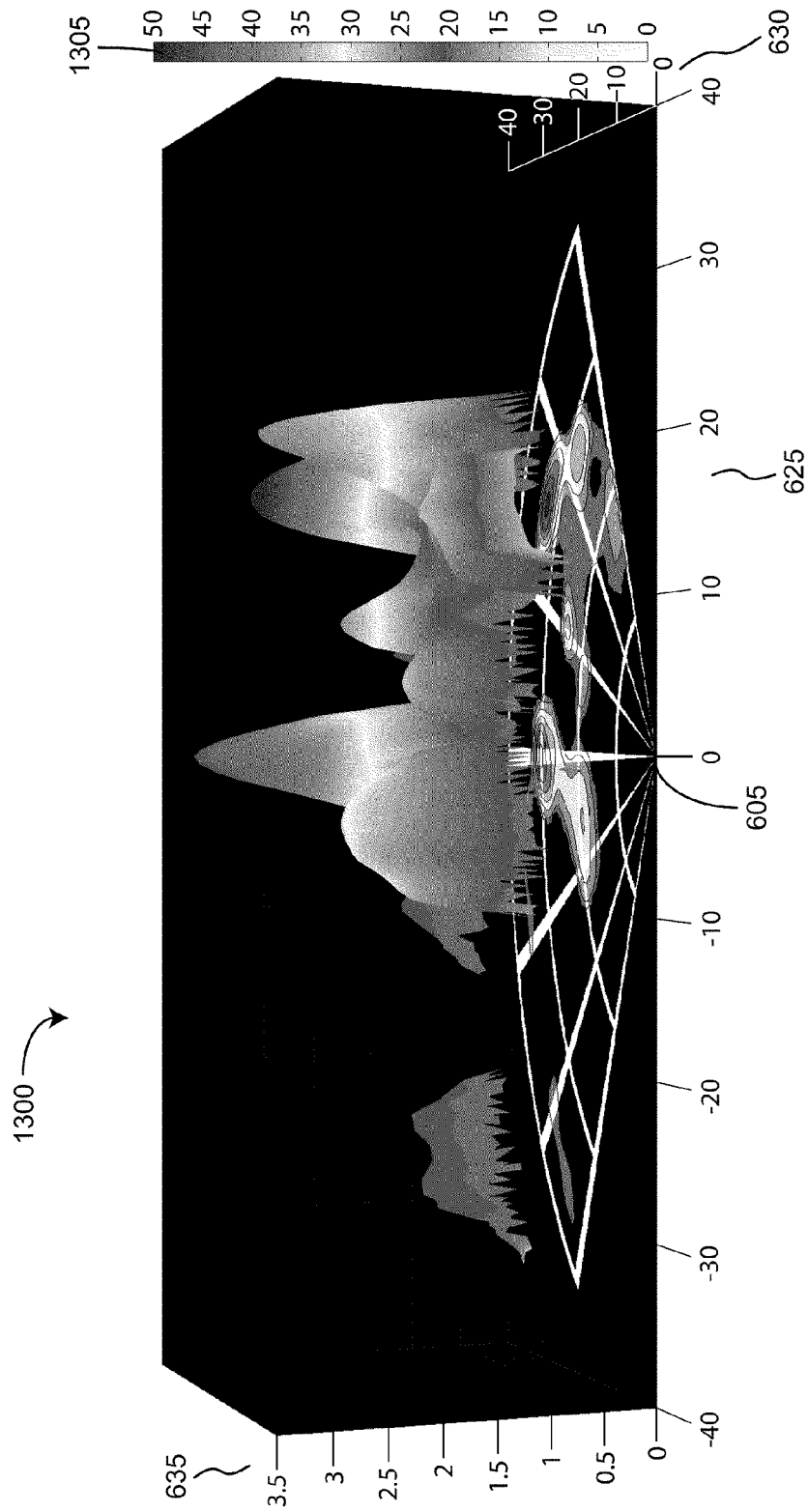

FIG. 13 illustrates a hybrid three-dimensional perspective display image 1300 in which a three-dimensional representation of weather in front of the aircraft is provided over the top of a plan view display of the weather. This may allow the pilot to view a familiar plan view of the weather in front of the aircraft while simultaneously being able to view a representation of the vertical extents of the weather represented in the plan view without having to switch to one or more vertical profile views. In some embodiments (e.g., in the normal or hybrid three-dimensional perspective view), a colormap index 1305 may be provided that informs the user of the data associated with the different illustrated colors (e.g., dBZ levels).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of displaying weather data relating to weather near an aircraft, the method comprising:

generating a three-dimensional weather profile of the weather near the aircraft based on reflectivity data from radar returns of a weather radar system of the aircraft, wherein generating the three-dimensional weather profile comprises estimating weather data above a freezing layer height using a function that is based on a rate of reduction in reflectivity above the freezing layer; and transmitting weather display data to a display device, the weather display data being configured to cause the display device to display a visual representation of the three-dimensional weather profile.

2. The method of claim 1, further comprising:
receiving user input from a user input device; and
rotating the visual representation of the three-dimensional weather profile based on the user input,
wherein the user input device is configured to allow a user to rotate the visual representation of the three-dimensional weather profile in three dimensions.

3. The method of claim 2, wherein the display device is a touch-sensitive display device and the user input device is a touch-sensitive display surface of the touch-sensitive display device.

4. The method of claim 1, wherein the weather display data is further configured to cause the display device to display range marks and bearing marks within the visual representation of the three-dimensional weather profile, the range marks and bearing marks providing a visual indication of a range and bearing to the weather near the aircraft based on a current position and bearing of the aircraft.

5. The method of claim 1, wherein the weather display data is further configured to cause the display device to display visual indicia of the relative severity of different portions of the weather near the aircraft within the visual representation of the three-dimensional weather profile.

6. The method of claim 1, wherein the function is based on a current geographic location of the aircraft.

7. The method of claim 1, further comprising:
receiving user input selecting a plane that intersects one or more weather cells displayed within the visual representation of the three-dimensional weather profile;
generating a two-dimensional profile view of the weather data relating to the one or more intersected weather cells along the selected plane; and
transmitting display data to the display device that is configured to cause the display device to display a visual representation of the weather data relating to the one or more intersected weather cells along the selected plane.

8. The method of claim 7, wherein the user input comprises at least one of a selection of two points or a selection of a line in the visual representation of the three-dimensional weather profile.

9. The method of claim 1, wherein the weather display data is further configured to cause the display device to display visual indicia representing whether weather cells displayed within the visual representation of the three-dimensional weather profile are growing or decaying.

10. The method of claim 1, wherein the weather display data is further configured to cause the display device to display visual indicia of threats to the aircraft presented by the weather near the aircraft based on the three-dimensional weather profile and a current flight path of the aircraft.

11. A system, comprising:
an electronic processor configured to:
generate a three-dimensional weather profile of weather near an aircraft based on reflectivity data from radar returns of a weather radar system of the aircraft;
estimate weather data of the three-dimensional weather profile above a freezing layer height using a function that is based on a rate of reduction in reflectivity above the freezing layer; and
transmit weather display data to a display device, the weather display data being configured to cause the display device to display a visual representation of the three-dimensional weather profile.

12. The system of claim 11, wherein the electronic processor is further configured to:
receive user input from a user input device; and
transmit data to the display device that causes the display device to rotate the visual representation of the three-dimensional weather profile based on the user input,
wherein the processor is configured to allow a user to rotate the visual representation of the three-dimensional weather profile in three dimensions.

13. The system of claim 12, wherein the display device is a touch-sensitive display device and the user input device is a touch-sensitive display surface of the touch-sensitive display device.

14. The system of claim 11, wherein the weather display data is further configured to cause the display device to display range marks and bearing marks within the visual representation of the three-dimensional weather profile, the range marks and bearing marks providing a visual indication of a range and bearing to the weather near the aircraft based on a current position and bearing of the aircraft.

15. The system of claim 11, wherein the weather display data is further configured to cause the display device to display visual indicia of the relative severity of different portions of the weather near the aircraft within the visual representation of the three-dimensional weather profile.

16. The system of claim 11, wherein the function is based on a current geographic location of the aircraft.

17. The system of claim 11, wherein the electronic processor is further configured to:
receive user input selecting a plane that intersects one or more weather cells displayed within the visual representation of the three-dimensional weather profile;
generate a two-dimensional profile of weather data relating to the one or more intersected weather cells along the selected plane; and
transmit display data to the display device that is configured to cause the display device to display a visual representation of the weather data relating to the one or more intersected weather cells along the selected plane.

18. One or more computer-readable storage media having instructions stored thereon, the instructions being executable by one or more processors to execute a method comprising:
generating a three-dimensional weather profile of weather near an aircraft based on reflectivity data from radar returns of a weather radar system of the aircraft, wherein generating the three-dimensional weather profile comprises estimating weather data above a freezing layer height using a function that is based on a rate of reduction in reflectivity above the freezing layer; and
transmitting weather display data to a display device, the weather display data being configured to cause the display device to display a visual representation of the three-dimensional weather profile.

19. The one or more computer-readable storage media of claim 18, wherein the method further comprises:
receiving user input from a user input device; and
rotating the visual representation of the three-dimensional weather profile based on the user input, wherein the user input device is configured to allow a user to rotate the visual representation of the three-dimensional weather profile in three dimensions.

20. The one or more computer-readable storage media of claim 18, wherein the weather display data is further configured to cause the display device to display range marks and bearing marks within the visual representation of the three-dimensional weather profile, the range marks and bearing marks providing a visual indication of a range and bearing to the weather near the aircraft based on a current position and bearing of the aircraft.

21. The one or more computer-readable storage media of claim 18, wherein the function is based on a current geographic location of the aircraft.

22. The one or more computer-readable storage media of claim 18, wherein the method further comprises:
  receiving user input selecting a plane that intersects one or more weather cells displayed within the visual representation of the three-dimensional weather profile;
  generating a two-dimensional profile view of weather data relating to the one or more intersected weather cells along the selected plane; and
  transmitting display data to the display device that is configured to cause the display device to display a visual representation of the weather data relating to the one or more intersected weather cells along the selected plane.

\* \* \* \* \*